United States Patent
Pande et al.

(10) Patent No.: US 11,024,302 B2
(45) Date of Patent: Jun. 1, 2021

(54) QUALITY FEEDBACK ON USER-RECORDED KEYWORDS FOR AUTOMATIC SPEECH RECOGNITION SYSTEMS

(71) Applicant: TEXAS INSTRUMENTS INCORPORATED, Dallas, TX (US)

(72) Inventors: Tarkesh Pande, Richardson, TX (US); Lorin Paul Netsch, Allen, TX (US); David Patrick Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 170 days.

(21) Appl. No.: 15/706,128

(22) Filed: Sep. 15, 2017

(65) Prior Publication Data
US 2018/0268815 A1 Sep. 20, 2018

Related U.S. Application Data

(60) Provisional application No. 62/470,910, filed on Mar. 14, 2017.

(51) Int. Cl.
*G10L 15/01* (2013.01)
*G10L 15/02* (2006.01)
(Continued)

(52) U.S. Cl.
CPC .............. *G10L 15/22* (2013.01); *G10L 15/02* (2013.01); *G10L 15/08* (2013.01);
(Continued)

(58) Field of Classification Search
CPC ....... G10L 15/22; G10L 15/02; G10L 15/008; G10L 15/025; G10L 2015/088; G10L 2015/025
See application file for complete search history.

(56) References Cited

U.S. PATENT DOCUMENTS 4,227,177 A * 10/1980 Moshier .................. G10L 15/00
704/231
4,489,435 A * 12/1984 Moshier .................. G10L 15/00
704/244

(Continued)

OTHER PUBLICATIONS

Lengerich et al ("An End-to-End Architecture for Keyword Spotting and Voice Activity Detection", arXiv preprint arXiv: 1611.09405, 2016). Retrieved from <https://arxiv.org/pdf/1611.09405.pdf> on Mar. 31, 2020. (Year: 2016).*

(Continued)

*Primary Examiner* — Daniel C Washburn
*Assistant Examiner* — Oluwadamilola M Ogunbiyi
(74) *Attorney, Agent, or Firm* — Lawrence J. Bassuk; Charles A. Brill; Frank D. Cimino

(57) ABSTRACT

Systems and methods are provided for an automated speech recognition system. A microphone records a keyword spoken by a user, and a front end divides the recorded keyword into a plurality of subunits, each containing a segment of recorded audio, and extracts a set of features from each of the plurality of subunits. A decoder assigns one of a plurality of content classes to each of the plurality of subunits according to at least the extracted set of features for each subunit. A quality evaluation component calculates a score representing a quality of the keyword from the content classes assigned to the plurality of subunits.

19 Claims, 3 Drawing Sheets

(51) Int. Cl.
 *G10L 15/08* (2006.01)
 *G10L 15/22* (2006.01)
(52) U.S. Cl.
 CPC .. *G10L 2015/025* (2013.01); *G10L 2015/088* (2013.01); *G10L 2015/221* (2013.01)

(56) References Cited

U.S. PATENT DOCUMENTS

| | | | | |
|---|---|---|---|---|
| 5,621,859 | A * | 4/1997 | Schwartz | G10L 15/142 704/256 |
| 6,125,345 | A * | 9/2000 | Modi | G10L 15/10 704/232 |
| 7,318,032 | B1 * | 1/2008 | Chaudhari | G10L 17/08 704/231 |
| 7,478,043 | B1 * | 1/2009 | Preuss | G10L 15/20 704/231 |
| 8,566,087 | B2 | 10/2013 | Cross, Jr. et al. | |
| 9,129,602 | B1 * | 9/2015 | Shepard | G10L 21/013 |
| 9,390,708 | B1 * | 7/2016 | Hoffmeister | G10L 15/02 |
| 9,779,721 | B2 * | 10/2017 | Donjon | G10L 15/02 |
| 2001/0014857 | A1 | 8/2001 | Wang | |
| 2002/0091511 | A1 * | 7/2002 | Hellwig | G10L 15/30 704/201 |
| 2004/0137846 | A1 * | 7/2004 | Behboodian | G10L 19/012 455/63.1 |
| 2006/0265216 | A1 * | 11/2006 | Chen | G10L 19/005 704/228 |
| 2007/0136054 | A1 * | 6/2007 | Kim | G10L 19/12 704/219 |
| 2007/0250320 | A1 | 10/2007 | Chengalvarayan | |
| 2008/0208577 | A1 * | 8/2008 | Jeong | G10L 15/32 704/231 |
| 2008/0319750 | A1 * | 12/2008 | Potter | G10L 15/26 704/255 |
| 2009/0271195 | A1 * | 10/2009 | Kitade | G10L 15/065 704/239 |
| 2009/0281807 | A1 * | 11/2009 | Hirose | G10L 21/003 704/254 |
| 2011/0131043 | A1 * | 6/2011 | Adachi | G10L 15/08 704/246 |
| 2011/0295590 | A1 * | 12/2011 | Lloyd | G10L 15/065 704/8 |
| 2013/0110521 | A1 * | 5/2013 | Hwang | H04W 52/028 704/500 |
| 2013/0289987 | A1 * | 10/2013 | Ganapathiraju | G10L 15/04 704/236 |
| 2014/0122087 | A1 * | 5/2014 | Macho | G10L 17/22 704/275 |
| 2015/0112689 | A1 * | 4/2015 | Nandy | G10L 19/002 704/270 |
| 2015/0120289 | A1 * | 4/2015 | Lev-Tov | G10L 15/26 704/231 |
| 2016/0171976 | A1 * | 6/2016 | Sun | H04W 52/0251 704/233 |
| 2016/0180838 | A1 * | 6/2016 | Parada San Martin | G06F 1/3203 704/232 |
| 2016/0267128 | A1 * | 9/2016 | Dumoulin | G06F 16/243 |
| 2016/0372122 | A1 * | 12/2016 | Zhang | G10L 19/06 |
| 2017/0133038 | A1 * | 5/2017 | Jiang | G10L 15/187 |
| 2018/0040323 | A1 * | 2/2018 | Lesso | G10L 17/02 |
| 2018/0204566 | A1 * | 7/2018 | Kanda | G10L 15/193 |
| 2018/0240460 | A1 * | 8/2018 | Matsumoto | G10L 21/00 |
| 2019/0139540 | A1 * | 5/2019 | Kanda | G10L 15/14 |

OTHER PUBLICATIONS

International Search Report for PCT/US2018/021670 dated Sep. 13, 2018.

* cited by examiner

QUALITY FEEDBACK ON USER-RECORDED KEYWORDS FOR AUTOMATIC SPEECH RECOGNITION SYSTEMS

RELATED APPLICATION

This application claims priority from U.S. Provisional Application No. 62/470,910, filed 14 Mar. 2017, the subject matter of which is incorporated herein by reference in its entirety.

TECHNICAL FIELD

The present invention relates generally to automatic speech recognition systems, and more particularly to providing quality feedback on user-recorded keywords for automatic speech recognition systems.

BACKGROUND

The internet of things (IOT) is at its infancy and is beginning to find more and more applications in homes, building automation and industrial settings. It is primarily driven by the ability to have chipsets which are able to run complicated algorithms at low-power and at low cost. A key enabling technology is the human-machine interaction via voice commands. One example of this scenario is the ability of devices to recognize and respond to short voice commands. These are known as keyword spotting applications.

SUMMARY

In one example, an automated speech recognition system is provided. A microphone records a keyword spoken by a user, and a front end divides the recorded keyword into a plurality of subunits, each containing a segment of recorded audio, and extracts a set of features from each of the plurality of subunits. A decoder assigns one of a plurality of content classes to each of the plurality of subunits according to at least the extracted set of features for each subunit. A quality evaluation component calculates a score representing a quality of the keyword from the content classes assigned to the plurality of subunits.

In another example, a method is provided. An input from a user is received at an automatic speech recognition system indicating that the user intends to submit a new keyword to the system, the keyword spoken by the user is recorded. A score is assigned to the keyword indicative of a quality of the keyword. The quality of the keyword represents at least one of a recognition rate of the keyword at a decoder of the automatic speech recognition system and a false positive rate of the keyword at the decoder of the automatic speech recognition system. Substantially real-time feedback representing the assigned score is provided to the user.

In a further example, an automated speech recognition system is provided. A microphone records a keyword spoken by a user, and a front end divides the recorded keyword into a plurality of subunits, each containing a segment of recorded audio, and extracts a set of features from each of the plurality of subunits. A decoder assigns one of a plurality of content classes to each of the plurality of subunits according to at least the extracted set of features for each subunit. A quality evaluation component calculates a score representing a quality of the keyword from the content classes assigned to the plurality of subunits. An output device that provides feedback on the quality of the keyword to the user. Each of the front end, the decoder, and the quality evaluation component are configured such that the output device provides the feedback substantially in real time.

DETAILED DESCRIPTION

In many practical applications, a user may wish to train a speech recognizer device with a keyword of their choice. For the purpose of this application, a "keyword" is a word or short phrase that is used by the user to request an action by the system via a speech recognition system. In many cases, a keyword is used to activate the system to receive a more complex command. The inventors have found that user-recorded keywords are not always suitable for a given speech recognition application, resulting in excessive recognition errors and corresponding frustration for the user. The systems and methods described herein provide direct feed-back to the user about the quality of the enrolled command for keyword spotting purposes. This quality measure indicates to the user whether or not the enrolled keyword is likely to perform well. A good quality score reflects that the enrolled keyword is likely to be correctly recognized a high percentage of the time and that non-keyword speech is not likely to be misrecognized as the keyword. A bad quality measure reflects the opposite. This score can be directly fed back to the user during a training period for the keyword, allowing the user to either re-train with a different keyword or re-train with the same keyword with a better enunciation.

Figure 1:
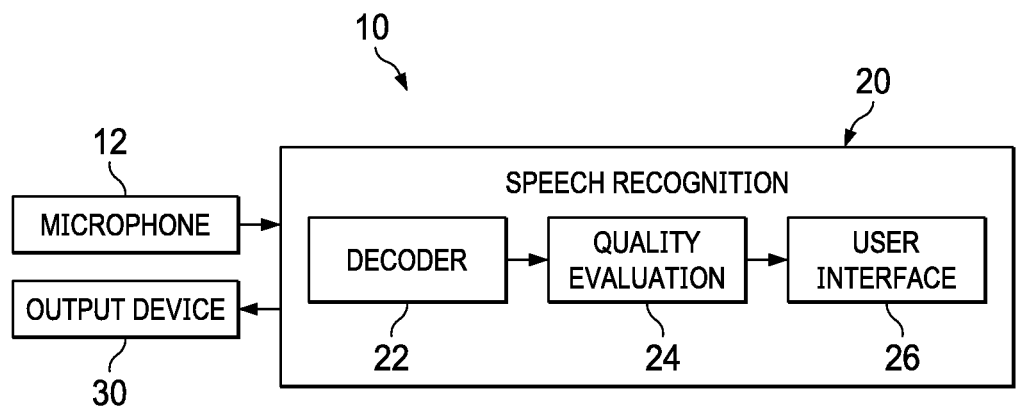
FIG. 1 illustrates one example of a system for evaluating the quality of a keyword for an automated speech recognition system.

FIG. 1 illustrates one example of a system 10 for evaluating the quality of a keyword for an automated speech recognition system 20. It will be appreciated that the automated speech recognition system can be implemented as machine readable instructions stored on a non-transitory computer readable medium and executed by an associated processor, as dedicated hardware, or as a mix of software and dedicated hardware. A microphone 12 records a keyword spoken by a user. The speech recognition system 20 comprises a decoder 22 and a quality evaluation component 24. The decoder 22 recognizes all or a portion of the keyword, and the quality evaluation component 24 assigns a score to the keyword representing a quality of the keyword.

For the purposes of this application, the quality of the keyword, or a score representing the quality, is a numerical or categorical parameter representing either or both of a recognition rate of the keyword at a decoder of the automatic speech recognition system and a false positive rate of the keyword at the decoder of the automatic speech recognition system. In one implementation, a weighted linear combination of these two values is used as the quality score. Feedback representing the quality score can be provided to the user at a user interface 26. It will be appreciated that the user interface 26 can interact with an output device 30 associated with the automated speech recognition system 20, such as a speaker or display, to provide the feedback to the user. In one implementation, the feedback is provided substantially in real-time, such that the user may adjust the keyword or its enunciation during training of the keyword in response to the provided feedback.

Figure 2:
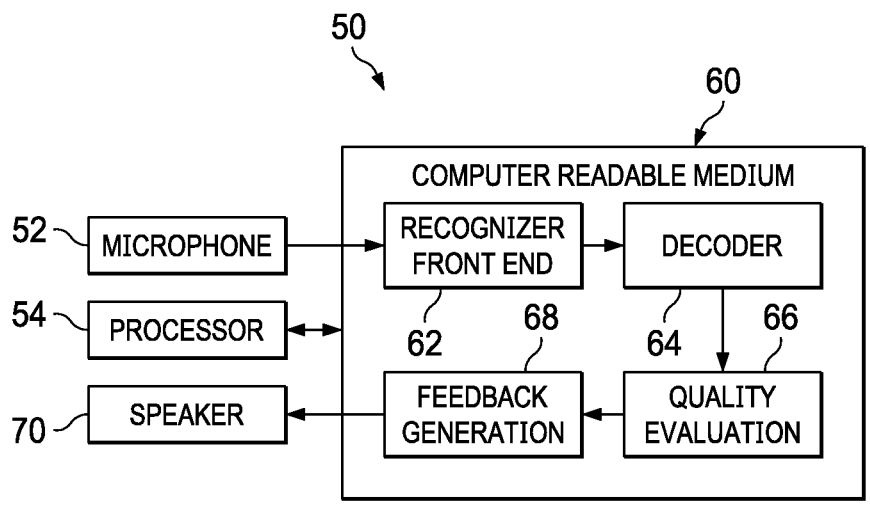
FIG. 2 illustrates another example of a system for evaluating the quality of a keyword for an automated speech recognition system.

FIG. 2 illustrates another example of a system 50 for evaluating the quality of a keyword for an automated speech recognition system. To evaluate the keyword quality, the system 50 first classifies each of the feature frames used in training a keyword model into different content classes, such as speech phonetic types, and then, based on the resulting sequence of content classes, assigns a quality score. Scoring rules for providing the quality score will depend on the type of decoder, the characteristics of the algorithm implemented in the decoder, the selected content classes, and the key word spotting application targeted. As an example, in applications where it is desired to have low false alarm rates, the scoring weighting may be more towards keywords that have more vowels and vowels of different kinds, since vowels are spectrally rich in information and generally contain higher acoustic signal energy.

The system 50 includes a microphone 52 that records a keyword spoken by a user, which is provided to a non-transitory computer readable medium 60 storing machine readable instructions, executable by an associated processor 54, to provide an automatic speech recognition system 60. A front end 62 of the speech recognition system divides the recorded keyword into a plurality of subunits. The recognizer front-end 62 also extracts a set of features from each of the plurality of subunits representing the audio content of each subunit. In the illustrated implementation, the recorded keyword is divided into frames of equal duration, such as ten milliseconds, to provide the subunits.

The recognizer front-end 62 converts the speech signal on a frame-by-frame basis to a set of feature vectors. The feature vectors represent a sufficient set of statistics for that frame of speech, and can include any of a variety of different representations, such as Mel-Frequency cepstral coefficients (MFCC), perceptual linear prediction coefficients (PLP), and linear predictive coding coefficients (LPC). In another implementation, one or more measures of the pitch, tone, and energy of the recorded speech can be utilized as features.

The extracted sets of features for each frame are then provided to a decoder 64 that assigns one of a plurality of content classes to each of the plurality of subunits according to at least the extracted set of features for each subunit. In one example, a model of the chosen keyword is generated from feature vectors generated during training. Then during recognition, the feature vectors are input to the decoder, implemented, for example, as a hidden Markov model, a convolutional neural network, or a deep neural network, and compared with one or more models to recognize the spoken keyword. In accordance with an aspect of the invention, the content classes can either be parameters already provided by the decoder 64 during normal operation, or the models at the decoder can be modified to provide the content classes in addition to the normal detection function.

It will be appreciated that the specific content classes selected will vary with the application. In one implementation, the plurality of classes can simply represent respective quality scores including at least a first class, representing a first quality score, and a second class, representing a second quality score that is different from the first quality score. In such a case, each frame is simply assigned a score based on its extracted features and, in some applications, the features or assigned classes of surrounding subunits. In another implementation, each of the content classes represents a phoneme being spoken by a user during the frame. In some systems, the detector 64 may be able to provide a phoneme for each frame as part of the existing recognition task. Specifically, in a system utilizing a model of the keyword and a filler or garbage model to identify or reject key words, the phonetic type can be determined using parameters generated in the filler model.

Turning to the detection of phonemes, the set of phonetic types used may depend on the ability of the decoder 64 to reliably classify them as such. In one embodiment, the set of phonetic types can include onsets, fricatives, nasals, vowels, offsets, and silence. It will be appreciated, however, that this set of phonemes is merely provided for the purpose of example, and that other sets of phonemes, and corresponding scoring systems, can be utilized. There are a variety of methods for mapping the feature frame, at a time n, to a corresponding phonetic type.

In a minimum distance based method, each phonetic type is first associated with a representative set of vectors. The idea is to find the vector across all the phonetic types that is closest to the input feature frame in terms of some distance measure. The length of the representative phonetic vector needs to be the same as that of the feature frame representation at the output of the front-end 62. The phonetic set of vectors can represent each phonetic type with different numbers of feature vectors and thus may be represented as:

$\{Onsets\}=[On_1, On_2, \ldots, On_{k1}]$
$\{Fricatives\}=[Fr_1, Fr_2, \ldots, Fr_{k2}]$
$\{Nasals\}=[Na_1, Na_2, \ldots, Na_{k3}]$
$\{Vowels\}=[Vo_1, Vo_2, \ldots, Vo_{k4}]$
$\{Offsets\}=[Off_1, Off_2, \ldots, Off_{k5}]$
$\{Silence\}=[Si_1, Si_2, \ldots, Si_{k6}]$ In this representation, a total number of phonetic vectors is $N=k_1+k_2+k_3+k_4+k_5+k_6$. If $Ph_i \in PhoneticSet$ $i \in 1, \ldots, N$ denotes a vector in the phonetic set, the minimum distance based rule classifies an input feature frame vector $FF(n)$ as one of onset, fricative, nasal, vowel, offset or silence based on the phonetic vector with the minimum p-norm error:

$$PhoneticType(n) = \underset{i \in 1, \ldots, N}{\operatorname{argmin}}(\|Ph_i - FF(n)\|_p) \qquad \text{Eq. 1}$$

In order to simplify calculations, the 2-norm can be used, such that p=2. In applications in which hidden Markov models are used, the hypothesis test is usually between a keyword model and a filler or garbage model. In this case, the vectors utilized in the filler model may correspond directly to the vectors in the phonetic set.

In the minimum distance method, the phonetic type at time instant n was chosen based on the feature frame of the input speech signal at time instant n. Alternatively, methods exist which take as input multiple feature frames (at different time instances) in order to make a decision on the phonetic type at time n, such that:

$$PhoneticType(n)=Function(FF(n-K), \ldots, FF(n), \ldots, FF(n+K)) \qquad \text{Eq. 2}$$

These methods try to employ the context of previous and future frames in order to make a decision on the current frame. One such example is neural network implementation, which assigns likelihood probabilities to all the phonetic types. A simple hard decision rule at the output of the neural network is to choose the phonetic type at the output with the largest likelihood probability.

Each element of the phonetic set may not be a single vector. In some embodiments, each element of the set may contain parameters that describe a probability distribution of frame features that correspond to the phonetic element. Then, when one or more feature frames are observed, the phonetic set element parameters are used to calculate the probabilistic likelihood that the observed feature frames correspond to each of the elements of the phonetic set. A similar simple hard decision rule as described for neural networks can be used, which is to choose the phonetic type that provides the largest likelihood. Other more complex decision rules may also be applied by taking into account sets of higher likelihoods for one or more input feature frames.

A quality evaluation component 66 calculates a score representing a quality of the keyword from quality scores assigned to the plurality of subunits. In an embodiment in which each content class represents a quality score or can be directly associated with a quality score, the quality evaluation component can simply provide a weighted linear combination of the quality scores. For example, where the content classes represent phonemes, each phoneme can represent a specific value, with values across a syllable summed to provide the quality score for that syllable. In one embodiment, all scores can be equally weighted, although it will be appreciated that weights could be applied to the quality scores according to the position of the frame within the recorded word. In other embodiments, the weights applied to each quality score can be derived from the content class of its associated frame and the content classes of surrounding frame.

In another embodiment, the quality evaluation component 66 utilizes a rule-based scoring system, in which each frame is assigned a score based on its associated content class as well as one or more other parameters. These parameters can be external to the content class determination, such as a tone, energy, or pitch of the frame, or can be drawn from the content classes of surrounding frames. In one embodiment, the quality evaluation component 66 assigns the quality score to each frame via a rule-based scoring in which the score for each frame is determined according to the phoneme associated with the frame as well as a phoneme associated with at least one adjacent frame.

Figure 3:
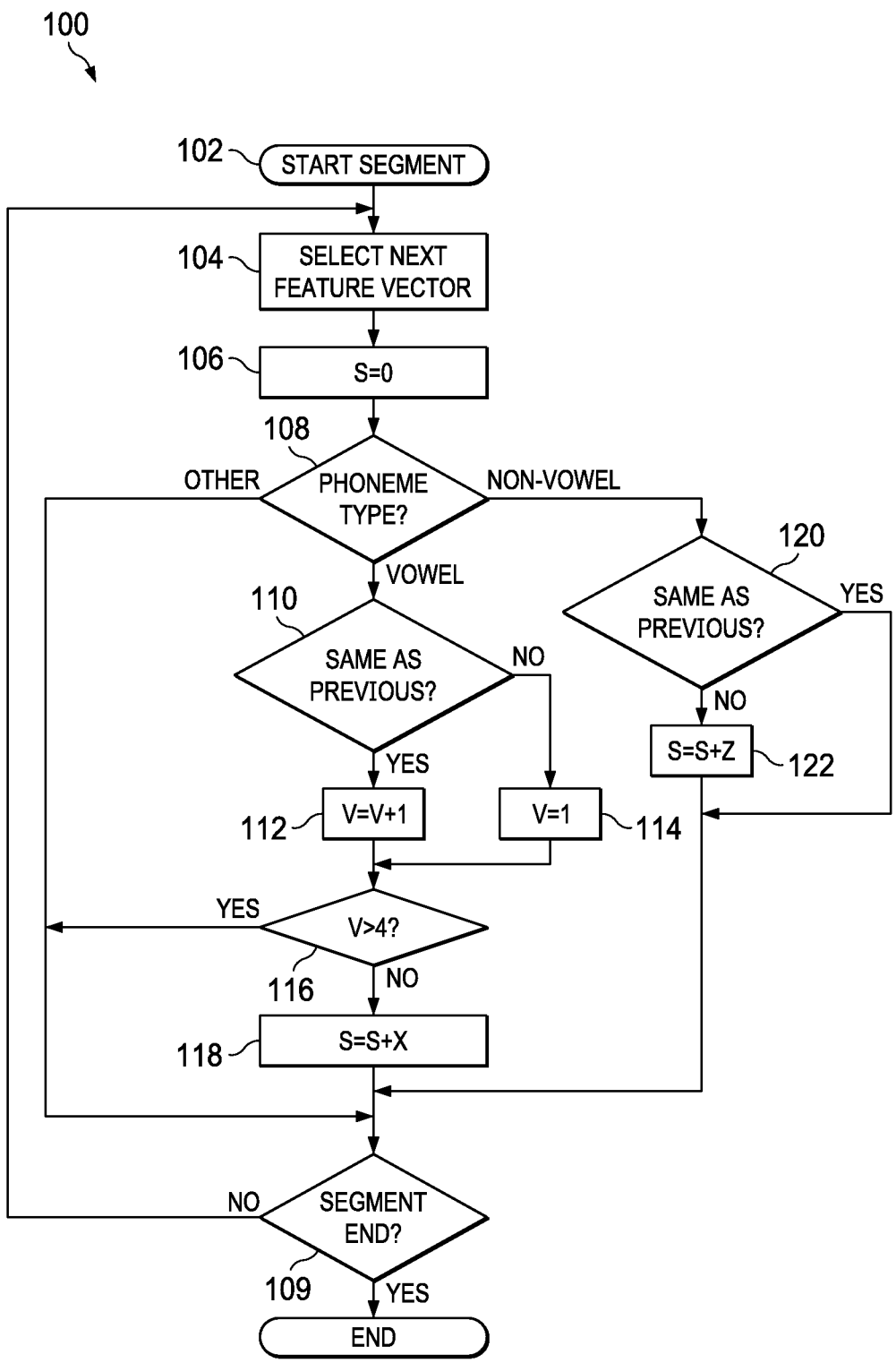
FIG. 3 is a flow chart illustrating one example of a rule-based scoring method for a keyword evaluation system in which the content classes are phonemes.

FIG. 3 is a flow chart illustrating one example of a rule-based scoring method 100 for a keyword evaluation system in which the content classes are phonemes. In such a system, the mapping of the training model's feature vectors to the phonetic types results in a sequence of phonetic types. For a training model consisting of M feature vectors, the resultant phonetic vector model may be given as phoneticModel=[Ph(1), . . . ,Ph(M)]. Each model is then broken into potentially multiple segments based on the phonetic class-type to which the input frame maps. Each syllabic segment is given a score, and it will be appreciated that the scoring system will vary with the desired application and the capabilities of the decoder 64. In some embodiments, for example, the scoring rules are biased toward putting more emphasis on sounds which have more vowels to reduce false positives in the keyword recognition.

At 102, a start of a segment is detected. The start of a segment may be indicated by an onset, a fricative, a nasal, and a vowel. At 104, a next feature vector is selected. At 106, the score, S, of the segment is initialized to zero. Other counters, such as the vowel counter described below, can be initialized to their various start values at this point as well. At 108, it is determined if the selected feature vector is a vowel, fricative, nasal, or onset phoneme. If the feature vector is not any of these phonemes (OTHER), the method advances to 109. At 109, it is determined if the segment has ended. The end of a segment may be indicated by an offset, silence, or an end of the model, that is, the last feature vector. If the segment has ended (Y), the method terminates. Otherwise (N), the method returns to 104 to select a next feature vector.

If the selected feature vector is a vowel (VOWEL), it is then determined at 110 if the identified vowel is a same vowel as a previous feature vector. If so (Y), the method advances to 112, where a counter, V, is incremented by one. If not (N), the method advances to 114, where the counter is reset to a value of one. Regardless, the method then proceeds to 116, where it is determined if the counter exceeds a threshold value. In this example, the threshold is four, although it will be appreciated that this threshold will vary with the desired application and the characteristics of the decoder 64. If the counter has a value higher than four (Y), the method advances to 109. If the counter has a value less than or equal to four (N), the score is incremented by a first value, X, at 118, and the method advances to 109. As an example, X can be set to 0.1.

Returning to 108, if the selected feature vector is a fricative, nasal, or onset (NON-VOWEL), it is then determined at 120 if the identified phoneme is a same phoneme as a previous feature vector. It will be appreciated that this does not refer just to the same general type, but to the specific fricative, nasal, or onset, as represented by the various representative phonetic vectors used in the classification task. If so (Y), the method advances to 109. If the phoneme is distinct (N), the score is incremented by a second value, Z, at 122, and the method advances to 109. As an example the value Z can be set to 0.1. Once the method terminates, the score, S, represents a quality of the segment. It will be appreciated that multiple segments can be added to obtain an overall quality for a keyword, such that a total quality score is then computed at the quality evaluation component 66 by adding up the individual syllabic segment scores and normalizing with respect to a constant so that the scores lie in a range between 0 and 1.

The computed score can be provided to a feedback generation component 68 to be provided to the user at an output device, such as a speaker 70. In one implementation, the score classified into a categorical parameter, such as "good", "bad", or "average," with this categorical parameter provided as feedback. Accordingly, the quality of the key word can be communicated to the user in a manner readily comprehensible without knowledge of the specific scoring system. In one implementation, each of the front end 62, the decoder 64, and the quality evaluation component 66 are designed such that the speaker 70 provides the feedback substantially in real time. This design allows the user to immediately record a new keyword when negative feedback is received.

Figure 4:
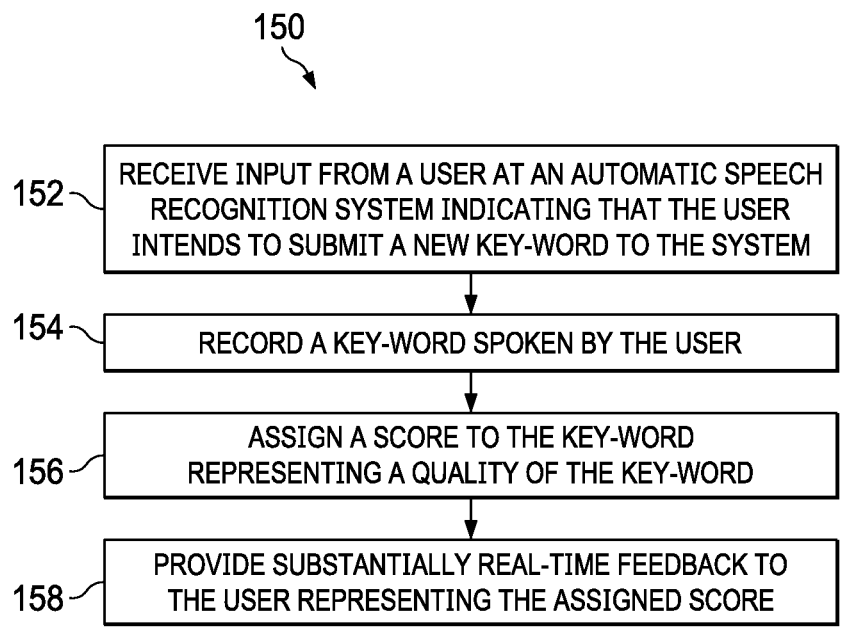
FIG. 4 illustrates a method for providing feedback to the user of an automatic speech recognition system representing a quality of a keyword recorded by a user.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates a method 150 for providing feedback to the user of an automatic speech recognition system representing a quality of a keyword recorded by a user. At 152, an input is received from a user at an automatic speech recognition system indicating that the user intends to submit a new keyword to the system. This procedure can be accomplished as an existing keyword command or via a software application associated with the recognition system. At 154, a keyword spoken by the user is recorded.

At 156, a score is assigned to the keyword representing a quality of the keyword, with the quality of the keyword representing either or both of a recognition rate of the keyword at a decoder of the automatic speech recognition system and a false positive rate of the keyword at the decoder of the automatic speech recognition system. In one embodiment, the recorded keyword is divided into a plurality of subunits, and a set of features is extracted from each of the plurality of subunits. One of a plurality of content classes is assigned to each of the plurality of subunits according to at least the extracted set of features for each subunit, and the score representing the quality of the keyword from the content classes assigned to the plurality of subunits.

In one embodiment, a quality score is assigned to each of the plurality of subunits according to at least its assigned content class and the quality scores are combined across the plurality of subunits to provide the score representing the quality of the keyword. For example, each subunit can be associated with one of a plurality of phonemes, with each phoneme having an associated quality score, such that a first phoneme has a first quality score and a second phoneme has a second quality score different from the first quality score. Alternatively, each subunit can be associated with one of the plurality of phonemes, and a quality score is assigned to each subunit according to the phoneme associated with the subunit as well as a phoneme associated with at least one adjacent subunit. In one example, a first score is assigned to each subunit representing a vowel if less than a threshold number of consecutive preceding subunits represented the same vowel, and a second score is assigned to each subunit representing one of a fricative, a nasal, and an onset if the one of a fricative, a nasal, and an onset is different from the phoneme assigned in an immediately preceding subunit. A total score can be assigned from the scores for the individual subunits, and substantially real-time feedback representing the assigned score can be provided to the user at 158.

Figure 5:
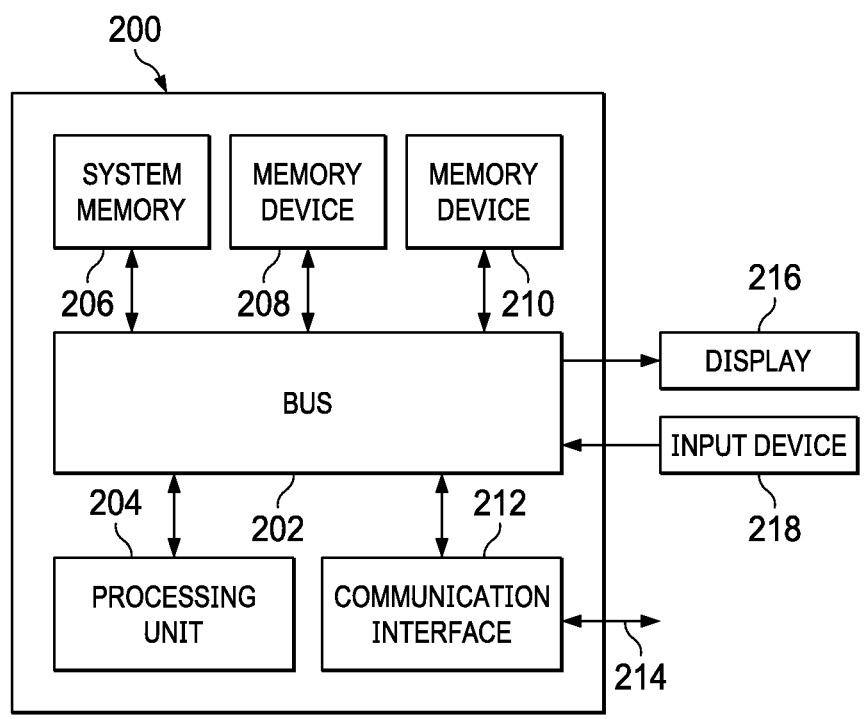
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 200 of hardware components capable of implementing examples of the systems and methods disclosed in FIGS. 1-4. The system 200 can include various systems and subsystems. The system 200 can be a personal computer, a laptop computer, a workstation, a computer system, an appliance, an application-specific integrated circuit (ASIC), a field programmable gate array (FPGA), a server, a server blade center, a server farm, or other computing device.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include at least one processing core. The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings. Additionally or alternatively, the system 200 can access an external data source or query source through the communication interface 212, which can communicate with the system bus 202 and the communication link 214.

In operation, the system 200 can be used to implement one or more parts of a keyword evaluation system in accordance with the present invention. Computer executable logic for evaluating a quality of the keyword resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a set of one or more non-transitory media that participate in providing instructions to the processing unit 204 for execution. These media can be local to the process or connected via a local network or Internet connection.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An automated speech recognition system, comprising:
a microphone adapted to receive audio of a keyword spoken by a user; and
a processing unit and memory device coupled to the microphone, the memory device including machine readable instructions having:
recording instructions to record the received audio in the memory device;
front end instructions that divide the recorded audio into subunits, each subunit containing a segment of recorded audio, and that extract a set of features from each of the subunits;

decoder instructions that assign a content class to each of the subunits according to the extracted set of features for each subunit; and quality evaluation component instructions that calculate a total score representing a quality of the keyword from the content classes assigned to the subunits, the quality of the keyword representing a recognition rate of the keyword at a decoder of the automatic speech recognition system and a false positive rate of the keyword at the decoder of the automatic speech recognition system;

in which the quality evaluation component instructions assign a first score for a subunit representing a given vowel only if less than a threshold number of consecutive preceding subunits represented the given vowel, assign a second score for a subunit representing one of a fricative, a nasal, and an onset only if the one of a fricative, a nasal, and an onset is different from a phoneme assigned to an immediately previous subunit, and assign the total score by adding the first scores and the second scores of all the subunits.

2. The system of claim 1, including an output device coupled to the processing unit that is adapted to provide feedback on the quality of the keyword to the user, each of the front end instructions, the decoder instructions, and the quality evaluation component instructions being configured such that the output device provides the feedback substantially in real time the feedback indicating the total score.

3. The system of claim 1, in which the features for each subunit include at least one of a pitch, an energy, a spectral representation of the audio, and a function of one of the pitch, the energy, and the spectral representation of the audio within the subunit.

4. The system of claim 1, in which the decoder associates each subunit with a phoneme, with each phoneme having an associated quality score, and combines the quality scores across at least a subset of the subunits to provide the score representing the quality of the keyword.

5. The system of claim 1, in which the front end instructions divide the keyword into a plurality of subunits, each subunit having a same duration.

6. The system of claim 5, in which the decoder instructions associate each subunit with a phoneme, with each phoneme having an associated quality score, and combines the quality scores across at least a subset of the subunits to provide the score representing the quality of the keyword.

7. The system of claim 5, in which the decoder instructions associate each subunit with a phoneme, the quality evaluation component instructions assigning a quality score to each subunit according to the phoneme associated with the subunit as well as a phoneme associated with at least one adjacent subunit.

8. The system of claim 7, in which the quality evaluation component instructions assign a first score for each subunit representing a vowel, and a second score for each subunit representing one of a fricative, a nasal, and an onset.

9. A method comprising:
receiving in a processing unit an input from a user at an automatic speech recognition system indicating that the user intends to submit a new keyword to the system;
recording in a memory device coupled to the processing unit the keyword spoken by the user;
assigning a score to the keyword indicative of a quality of the keyword, including representing the quality of the keyword with a recognition rate of the keyword at a decoder of the automatic speech recognition system and a false positive rate of the keyword at the decoder of the automatic speech recognition system;
assigning in a quality evaluation component a first score for a subunit of the keyword representing a given vowel only if less than a threshold number of consecutive preceding subunits of the keyword represented the given vowel, and assigning in the quality evaluation component a second score for a subunit of the keyword representing one of a fricative, a nasal, and an onset only if the one of a fricative, a nasal, and an onset is different from a phoneme assigned to an immediately previous subunit;
assigning a total score by adding the first score and the second score of all the subunits; and
providing from the processing unit substantially real-time feedback representing the total score to the user.

10. The method of claim 9, including:
dividing the recorded keyword into a plurality of subunits;
extracting a set of features from each of the plurality of subunits; and
assigning one of a plurality of content classes to each of the plurality of subunits according to at least the extracted set of features for each subunit;
the assigning the score to the keyword representing the quality of the keyword includes determining the score representing the quality of the keyword from the content classes assigned to the plurality of subunits.

11. The method of claim 10, in which
determining the score representing the quality of the keyword from the content classes assigned to the subunits includes:
assigning a quality score to each of the subunits according to at least its assigned content class; and
combining the quality scores across the subunits to provide the score representing the quality of the keyword.

12. The method of claim 10, in which assigning one of the plurality of content classes to each of the plurality of subunits includes associating each subunit with a phoneme, with each phoneme having an associated quality score, such that a first phoneme has a first quality score and a second phoneme has a second quality score different from the first quality score.

13. The method of claim 10, in which assigning one of the content classes to each of the subunits includes associating each subunit with a phoneme and assigning a quality score to each subunit according to the phoneme associated with the subunit as well as a phoneme associated with at least one adjacent subunit.

14. The method of claim 13, in which the quality evaluation component assigns the quality score for a given subunit as a function of the phonemes assigned to at least one prior subunit and the phoneme assigned to the given subunit.

15. An automated speech recognition system, comprising:
a microphone adapted to receive audio of a keyword spoken by a user;
a processing unit and memory device coupled to the microphone, the memory device including machine readable instructions having:
recording instructions to record the received audio in the memory device;
front end instructions that divide the recorded keyword into subunits, each subunit containing a segment of the recorded audio, and that extract a set of features from each of the subunits;

decoder instructions that assign a content class to each of the subunits according to at least the extracted set of features for each subunit;

quality evaluation component instructions that calculate a total score representing a quality of the keyword from the content classes assigned to the subunits, the quality of the keyword representing a recognition rate of the keyword at a decoder of the automatic speech recognition system and a false positive rate of the keyword at the decoder of the automatic speech recognition system, the quality evaluation component instructions assign a first score for a subunit representing a given vowel only if less than a threshold number of consecutive preceding subunits represented the given vowel, assign a second score for a subunit representing one of a fricative, a nasal, and an onset only if the one of a fricative, a nasal, and an onset is different from a phoneme assigned to an immediately previous subunit, and assign the total score by adding the first score and the second score of all the subunits; and an output device coupled to the processing unit that is adapted to provide feedback indicating the total score of the keyword to the user;

each of the front end instructions, the decoder instructions, and the quality evaluation component instructions are configured such that the output device provides the feedback substantially in real time.

16. The system of claim 15, in which a first content class represents a first quality score and a second content class represents a second quality score that is different from the first quality score, the quality evaluation component instructions determining the score representing a quality of the keyword by combining the quality scores assigned to each of the sub-units.

17. The system of claim 15, in which the decoder instructions associate each subunit with a phoneme, with each phoneme having an associated quality score, and combines the quality scores across at least a subset of the subunits to provide the score representing the quality of the keyword.

18. The system of claim 17, in which the quality evaluation component instructions assign a first score for each subunit representing a vowel, and a second score for each subunit representing a non-vowel phoneme.

19. The system of claim 15, in which the decoder instructions associate each subunit with a phoneme, the quality evaluation component assigning a quality score to each subunit according to the phoneme associated with the subunit as well as a phoneme associated with at least one adjacent subunit.

* * * * *